United States Patent [19]
Yoshida

[11] Patent Number: 5,818,559
[45] Date of Patent: Oct. 6, 1998

[54] LIQUID CRYSTAL DISPLAY HAVING DIFFERENT LINEAR EXPANSION COEFFICIENTS AMONG THE MATERIALS OF THE DISPLAY

[75] Inventor: Toru Yoshida, Kanagawa, Japan

[73] Assignee: Fuji Photo Film Co., Ltd., Kanagawa, Japan

[21] Appl. No.: 723,958

[22] Filed: Sep. 26, 1996

[30] Foreign Application Priority Data

Sep. 26, 1995 [JP] Japan ................................. 7-271736

[51] Int. Cl.⁶ ...................... G02F 1/1333; G02F 1/1335
[52] U.S. Cl. ........................ 349/122; 349/96; 349/119; 349/138
[58] Field of Search ........................ 349/96, 117, 119, 349/122, 138; 428/423.1

[56] References Cited

U.S. PATENT DOCUMENTS

| | | | |
|---|---|---|---|
| 4,085,620 | 4/1978 | Tanaka | 73/727 |
| 4,717,624 | 1/1988 | Ikenaga et al. | 428/423 |
| 4,744,637 | 5/1988 | Sekimura et al. | 349/122 |

*Primary Examiner*—William L. Sikes
*Assistant Examiner*—Julie Ngo
*Attorney, Agent, or Firm*—Birch, Stewart, Kolasch & Birch, LLP

[57] ABSTRACT

In the art of liquid crystal displays, there is the problem of differential expansion or contraction of components of the display upon changes in temperature. This leads to degradation of the display upon changes in temperature. The liquid crystal display of the invention includes at least a liquid crystal cell and a polarizing sheet. The liquid crystal display of the invention optionally further includes a phase retarder. The components of each of these elements are made of materials such that differences in the linear expansion coefficients among the materials is less than $0.5 \times 10^{-5}/°C$.

22 Claims, 2 Drawing Sheets

LIQUID CRYSTAL DISPLAY HAVING DIFFERENT LINEAR EXPANSION COEFFICIENTS AMONG THE MATERIALS OF THE DISPLAY

FIELD OF THE INVENTION

The present invention relates to a liquid crystal display comprising a liquid crystal cell and a polarizing sheet stuck with an adhesive layer. The invention also relates to a liquid crystal display further comprising a phase retarder.

BACKGROUND OF THE INVENTION

A liquid crystal display usually comprises a liquid crystal cell and a polarizing sheet.

The liquid crystal cell comprises a liquid crystal, a pair of substrates and an electrode layer. The substrates form a cell containing the liquid crystal. The electrode layer has a function of applying a voltage to the liquid crystal. The substrate and the electrode are made from transparent substances to display an image.

The transparent substrate is usually made of a glass plate or a resin film. The resin film is preferred to the glass plate in the case that the liquid display requires flexibility. The substrate of the liquid crystal cell requires low birefringence and high heat-resistance as well as high transparency.

The polarizing sheet comprises a polarizing film and a protective film. The polarizing film usually is a resin film containing iodine or a dichromatic dye as a polarizing material. The protective film is provided on one side or both sides of the polarizing film. In the case that the protective film is provided on only one side of the polarizing film, the above-mentioned substrate of the cell further functions as the protective film on the other side. The protective film requires low birefringence and high transparency.

The liquid crystal display may further have a phase retarder, which is made of a birefringent film. The phase retarder has a function of removing color from the display to form a clear black and white image. The phase retarder is also made of a resin. The phase retarder requires high birefringence.

Each of the substrate of the liquid crystal cell, the protective film of the polarizing sheet and the phase retarder generally comprises a resin film, as is described above. According to the prior art, the substrate, the protective film and the phase retarder have independently been prepared of various resins, each of which has an optical characteristic appropriate for each use.

The liquid crystal cell and the substrate thereof are described in Japanese Patent Provisional Publication Nos. 5(1993)-61026 (corresponding to U.S. Pat. No. 5,334,424) and 7(1995)-126375.

Japanese Patent Provisional Publication No. 5(1993) 61026 discloses a liquid crystal substrate comprising a thermoplastic norbornene film. The publication further discloses a liquid crystal display produced therefrom. However, the publication does not describe a polarizing sheet and a phase retarder in detail.

Japanese Patent Provisional Publication No. 7(1995) 126375 discloses an optical polycarbonate resin sheet having a birefringence of not more than 10 nm. The publication describes that the sheet is prepared by thermally treating a polycarbonate resin sheet having a thickness of not more than 1.5 mm, to which a protective film is attached. The publication further describes that the sheet can be used as a flat panel (substrate) of a liquid crystal unit (liquid crystal cell). However, the publication does not describe the polarizing sheet and the phase retarder in detail.

The polarizing sheet and the protective film thereof are described in Japanese Patent Provisional Publication Nos. 4(1992)-219703, 5(1993)-212828 and 6(1994)-51117 (corresponding to WO 9302381-A1).

Japanese Patent Provisional Publication No. 4(1992) discloses a polarizing sheet containing an ultraviolet absorbing agent that is reduced by 50 wt. % at a temperature of 280° C. or higher. The publication does not describe the liquid crystal cell and the phase retarder in detail.

Japanese Patent Provisional Publication No. 5(1993) 212828 discloses a complex sheet comprising a polyvinyl alcohol sheet and a thermoplastic saturated norbornene resin sheet. The two sheets are stuck with an acryl adhesive layer by heating and pressing them. The publication describes that an example of the polyvinyl alcohol sheet is a polarizing film and an example of the norbornene resin sheet is a protective film. The publication does not describe the liquid crystal cell and the phase retarder in detail.

Japanese Patent Provisional Publication No. 6(1994) 51117 discloses a polarizing film comprising a thermoplastic saturated norbornene resin sheet as a protective layer provided on at least one side of a polarizing membrane. The publication does not describe the liquid crystal cell and the phase retarder in detail.

The phase retarder is described in Japanese Patent Publication No. 6(1994)-77084 (corresponding to U.S. Pat. No. 5,061,042), Japanese Patent Provisional Publication Nos. 2(1990)-42406 (corresponding to U.S. Pat. No. 5,061,042) and 2(1990)-256003 (corresponding to U.S. Pat. No. 5,244, 713).

Japanese Patent Publication No. 6(1994)-77084 discloses a phase retarder obtained by uniaxially stretching a film of polyvinyl alcohol or its derivative, treating the film with an aqueous solution of boric acid or aldehyde, and sticking both sides or one side of the film with an optically non-oriented transparent polymer film or sheet. The phase retarder has a color difference is not more than 20. The publication further describes a liquid crystal cell and a polarizing sheet. However, the publication does not describe the substrate of the cell and the protective film of the polarizing sheet in detail.

Japanese Patent Provisional Publication Nos. 2(1990) 42406 discloses a phase retarder comprising a thermoplastic polymer film (or sheet) having a retardation value in the range of 80 to 1,200 nm and a color difference of not more than 80. The publication further describes a complex polarizing sheet and a liquid crystal display using the phase retarder. However, the publication does not describe the substrate of the cell and the protective film of the polarizing sheet in detail.

Japanese Patent Provisional Publication No. 2(1990) 256003 discloses a thermoplastic polymer film or sheet having no thickness variation of sine waveform. The publication further discloses an optical film having a retardation value of 1,200 nm or less with a variation of not more than 10%. The optical film is obtained by uniaxially stretching in the transverse direction or by biaxially stretching the thermoplastic polymer film or sheet. The optical film is used as a phase retarder. The publication further describes a complex polarizing sheet and a liquid crystal display using the phase retarder. However, the publication does not describe the substrate of the cell and the protective film of the polarizing sheet in detail.

Each of the above-mentioned publications relates to an improvement of one of the substrate, the protective film and the phase retarder. Therefore, the publications do not describe independently the other elements of the liquid crystal display in detail.

Japanese Patent Provisional Publication Nos. 62(1987) 89907 and 1(1989)-295225 propose that one resin film functions as a substrate of a liquid crystal cell as well as a protective film of a polarizing sheet to obtain a thin and light liquid crystal display.

Japanese Patent Provisional Publication No. 62(1987) 89907 discloses a polarizing film-integrated transparent electrically conductive film, wherein a polysulfone film as a support layer is laminated on at least one surface of a polyvinyl alcohol polarizing film which has been dyed with a specific water-soluble bis-azo compound or a-copper complex compound thereof. The polysulfone film (support layer) functions as a substrate of a liquid crystal cell as well as a protective film of a polarizing sheet.

Japanese Patent Provisional Publication No. 1(1989) 295225 discloses a liquid crystal element comprising first transparent films having a polarizing element therebetween and second transparent films having a polarizing element and an optical refractive layer therebetween. Transparent electrodes are formed on the facing surfaces of the first and the second transparent films. A liquid crystal layer is sandwiched between the first and the second transparent films having the transparent electrodes. The first and second transparent films function as substrates of a liquid crystal cell as well as protective films of a polarizing sheet.

SUMMARY OF THE INVENTION

The applicant has studied a liquid crystal display, and found distortion of an image produced under some conditions. Further, an adhesive, which is used to stick the elements of the liquid crystal display sometimes peels from the display. These problems about the dimensional stability have scarcely been solved by the prior art.

Only liquid crystal displays disclosed in Japanese Patent Provisional Publication Nos. 62(1987)-89907 and 1(1989)-295225 are free from the problems about the dimensional stability. In these liquid crystal displays, one transparent resin film functions as a substrate of a liquid crystal cell as well as a protective film of a polarizing sheet. However, such displays have another problem that a polarizing film is damaged at a high temperature (usually 100° C. or higher) at a process of attaching a transparent electrode to the substrate. Further, each of the substrate, the protective film and the phase retarder is a resin film that independently functions in a liquid crystal display. Therefore, it is impossible to adjust a characteristic of the resin film appropriately in the case that one film have two or more functions. Particularly, each of the substrate and the protective film preferably is an independent resin film.

The applicant has further studied the problem about the dimensional stability, and finally found that the problem is caused by a difference in linear expansion coefficient between the resin of the substrate, the resin of the protective film and the resin of the phase retarder. Even if a liquid crystal display were constructed according to an exact dimension, an image would be distorted or an adhesive would peel from the display by the change of the temperature.

An object of the invention is to provide a liquid crystal display that is free from the problems about the dimensional stability.

Another object of the invention is to provide a liquid crystal display in which each of a substrate of a liquid crystal cell, a protective film of a polarizing sheet and a phase retarder independently functions.

The present invention provides a liquid crystal display which comprises a liquid crystal cell and a polarizing sheet stuck with an adhesive layer, said cell comprising a liquid crystal interposed between a pair of resinous substrates, at least one of which has a transparent electrode, and said polarizing sheet comprising a polarizing film interposed between a pair of resinous protective films, wherein difference in a linear expansion coefficient between the resin of the substrate facing the polarizing sheet and the resin of the protective film facing the liquid crystal cell is less than $0.5 \times 10^{-5}$/°C.

The invention also provides a liquid crystal display which comprises a liquid crystal cell, a polarizing sheet and a phase retarder stuck with adhesive layers, said cell comprising a liquid crystal interposed between a pair of substrates, at least one of which has a transparent electrode, and said polarizing sheet comprising a polarizing film interposed between a pair of protective films, wherein the substrate, the protective film and the phase retarder attached on the adhesive layers are made of resins having such a linear expansion coefficient that the differences in the coefficient between the resins are less than $0.5 \times 10^{-5}$/°C.

DETAILED DESCRIPTION OF THE INVENTION

Figure 1:
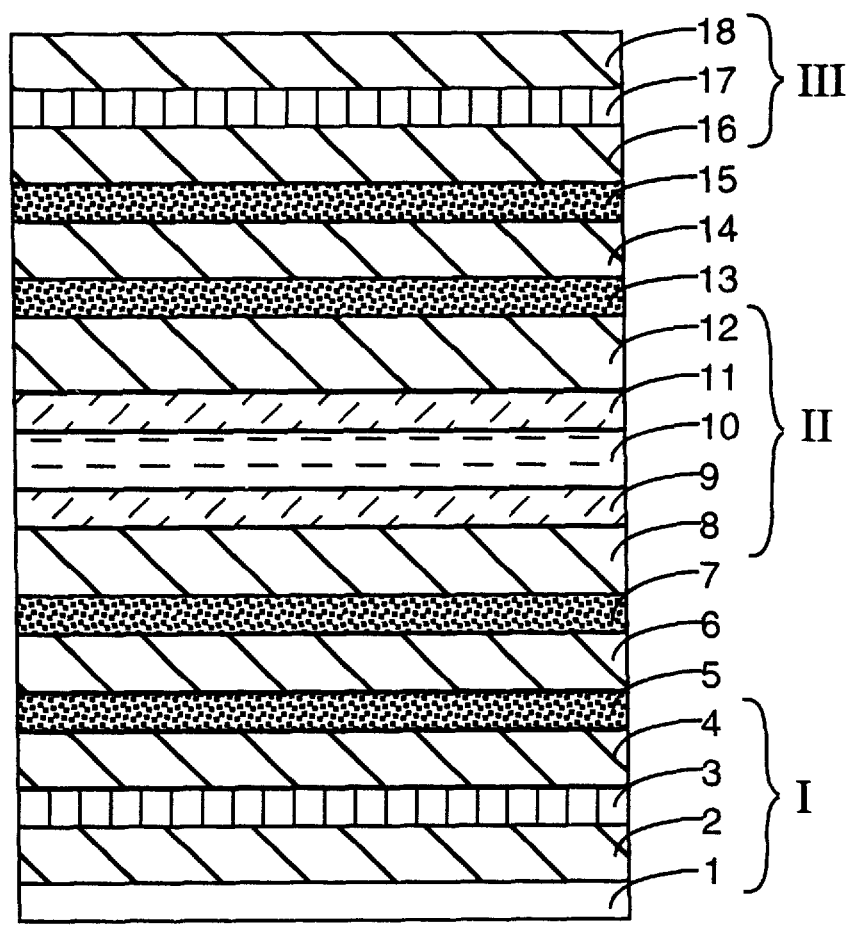
FIG. 1 is a sectional view schematically illustrating a layered structure of a liquid crystal display.

Each of the substrate, the protective film and the phase retarder is made of a resin. Examples of the resins include a cellulose resin, a polycarbonate resin, a polyarylate resin, a polysulfone resin, a polyethersulfone resin, a norbornene resin, a polystyrene resin, a polyacrylate resin, a polymethacrylate resin and a polyester resin. The polycarbonate resin, the polyarylate resin, the polysulfone resin, the polyethersulfone resin, the norbornene resin, the polyacrylate resin, the polymethacrylate resin and the polyester resin are preferred to the cellulose resin and the polystyrene resin, because the former resins are rather superior to the latter resins in heat resistance. The polycarbonate resin is particularly preferred. The resin has a glass transition temperature preferably of not lower than 120° C., more preferably of not lower than 160° C., and most preferably of not lower than 170° C.

According to the present invention, a liquid crystal display which comprises a liquid crystal cell, a polarizing sheet and a resinous phase retarder stuck with adhesive layers, said cell comprising a liquid crystal interposed between a pair of resinous substrates, at least one of which has a transparent electrode, and said polarizing sheet comprising a polarizing film interposed between a pair of resinous protective films, wherein differences in a linear expansion coefficient between the resin of the substrate facing the polarizing sheet, the resin of the protective film facing the liquid crystal cell and the resin of the phase retarder are less than $0.5 \times 10^{-5}$/°C.

A triacetyl cellulose (TAC) resin has a linear expansion coefficient in the range of $4 \times 10^{-5}$/°C. to $16 \times 10^{-5}$/°C. A polycarbonate resin has a linear expansion coefficient in the range of $3 \times 10^{-5}$/°C. to $7 \times 10^{-5}$/°C. A polyacrylate resin has a linear expansion coefficient in the range of $4 \times 10^{-5}/°C$. to $7 \times 10^{-5}/°C$. A norbornene resin has a linear expansion coefficient in the range of $6 \times 10^{-5}/°C$. to $7 \times 10^{-5}/°C$. A polysulfone or polyethersulfone resin has a linear expansion coefficient of about $5.5 \times 10^{-5}/°C$. The linear expansion coefficients of various plastic resins are described in J. Agranoff, Ed., "Modern Plastics Encyclopedia 1983-184", p. 470–501, McGraw-Hill (1983). The linear expansion coefficient can be determined according to ASTM D-696.

The resins of the substrate, the protective film and the phase retarder attached on the adhesive layer can be identical. The substrate, the protective film and the phase retarder are elements, which independently function in a liquid crystal display. Accordingly, the substrate, the protective film and the phase retarder should have physical and chemical characteristics, particularly optical characteristics appropriate for each of the functions. For example, the resin of the substrate requires high heat resistance because an electrode layer is attached to the substrate at a high temperature (usually 100° C. or more). The protective film of a polarizing sheet is usually arranged as the outermost layer in a liquid crystal display. Accordingly, the protective film requires a protective function, such as a function of absorbing ultraviolet The phase retarder requires high birefringence for its phase retarding function. On the other hand, the substrate and the protective film require low birefringence.

As is described above, the substrate, the protective film and the phase retarder require different characteristics according to each of the functions. Therefore, it has not yet been considered that the substrate, the protective film and the phase retarder are made of an identical resin.

However, the applicant has noted that the substrate, the protective film and the phase retarder can satisfy the requirements, even if they are made of an identical resin. In more detail, resin films appropriate for the substrate, the protective film and the phase retarder can be prepared from the identical resin by arranging conditions of a casting method, a stretching method or a thermal treatment. The casting method, the stretching method and the thermal treatment are described below.

[Casting method]

A resin film can be formed by a melt casting method or a solvent casting method. The melt casting method comprises heating a resin to form a melt, casting the melt on a support and cooling the melt to form a film. The solvent casting method comprises dissolving a resin in a solvent to form a solution (dope), casting the dope on a support and drying the dope to form a film.

The melt casting method can form a film of relatively low birefringence. Accordingly, the substrate and the protective film can be formed by the melt cast method. However, the solvent casting method is superior to the melt casting method in the flatness of film. Therefore, the substrate and the protective film as well as the phase retarder are preferably formed by the solvent casting method.

The solvent casting method can be classified into a band casting method using a band as the support and a drum casting method using a drum as the support. The band casing method is described in Japanese Patent Publication Nos. 39(1964)-29211, 62(1987)-43848 and Japanese Patent Provisional Publication No. 61(1986)-100421. The drum casting method is described in Japanese Patent Provisional Publication Nos. 62(1987)-64514 and 62(1987)-115035.

The solvent and concentration of the solution are determined by the nature of resin. The concentration is usually in the range of 5 to 80 wt. %, and preferably in the range of 10 to 70 wt. %.

Optical irregularities are sometimes formed by drying the film with air. Particularly, the phase retarder should be dried under windless conditions. The windless drying process is described in Japanese Patent Provisional Publication No. 4(1992)-201310.

The substrate of a liquid crystal cell requires high flatness. Accordingly, a resin film for the substrate can be surface-treated, for example polished to increase the flatness of the film surface.

[Stretching Method]

A resin film is stretched to prepare a phase retarder. In more detail, the film is stretched at a temperature of higher than the softening point of the resin to orient the molecules in the resin film, whereby birefringence is formed in the film. The film is usually uniaxially stretched. However, the film may be biaxially stretched if a liquid crystal display (such as a display using a homeotropic liquid crystal) requires an orientation in the direction of thickness.

The film is stretched using rollers or a tenter. The birefringence required for the phase retarder is determined by the nature of a liquid crystal. The birefringence of the phase retarder obtained by the stretching method is usually in the range of 10 to 1,200 nm, which satisfies the requirement of the usual liquid crystal.

The film is stretched preferably at a temperature of not lower than the glass transition temperature of the resin. The difference between the film stretching temperature and the glass transition temperature preferably is 5° C. or more. When the film is stretched at an extremely high temperature, birefringence of the film is reduced. Further, the film is softened at a high stretching temperature so that it is difficult to handle the film. Therefore, the difference between the film stretching temperature and the glass transition temperature preferably is 20° C. or less.

[Thermal Treatment]

Orientation of a resin film can be reduced by a thermal treatment. In the preparation of a phase retarder, a resin film can be subjected to a thermal treatment to reduce orientation inherently contained in the film, and then subjected to the above-mentioned stretching method to form orientation required for the phase retarder.

Further, a resin film can be subjected to a thermal treatment to reduce birefringence in the preparation of the substrate and the protective film.

The temperature of the thermal treatment is higher than the softening point of the resin. The temperature of the thermal treatment is preferably higher than the glass transition temperature. The difference between the temperature of the thermal treatment and the glass transition temperature preferably is 50° C. or more.

[Layed Structure of Liquid Crystal Display]

FIG. 1 is a sectional view schematically illustrating a layered structure of a liquid crystal display (most preferred embodiment of the present invention).

As is shown in FIG. 1, a liquid crystal (10) is placed between a pair of resin substrates (8 & 12). Transparent electrodes (9 & 11) are provided on the liquid crystal sides of the resin substrates (8 & 12). A liquid crystal cell (II) comprises the above-mentioned liquid crystal, the resin substrates, and the transparent electrodes (8 to 12).

Phase retarders (6 & 14) are stuck on both sides of the liquid crystal cell (II) by adhesive layers (7 & 13).

Further, polarizing sheets (I & III) are stuck on the phase retarders (6 & 14) by adhesive layers (5 & 15). The polarizing sheets comprise polarizing films (3 & 17) provided between protective films (2, 4, 16 & 18).

One polarizing sheet (I) further has a surface-treated membrane (1), which is the outermost layer of the display.

A back light (not shown in Figure) is provided on the surface of the other polarizing sheet (III).

Figure 2:
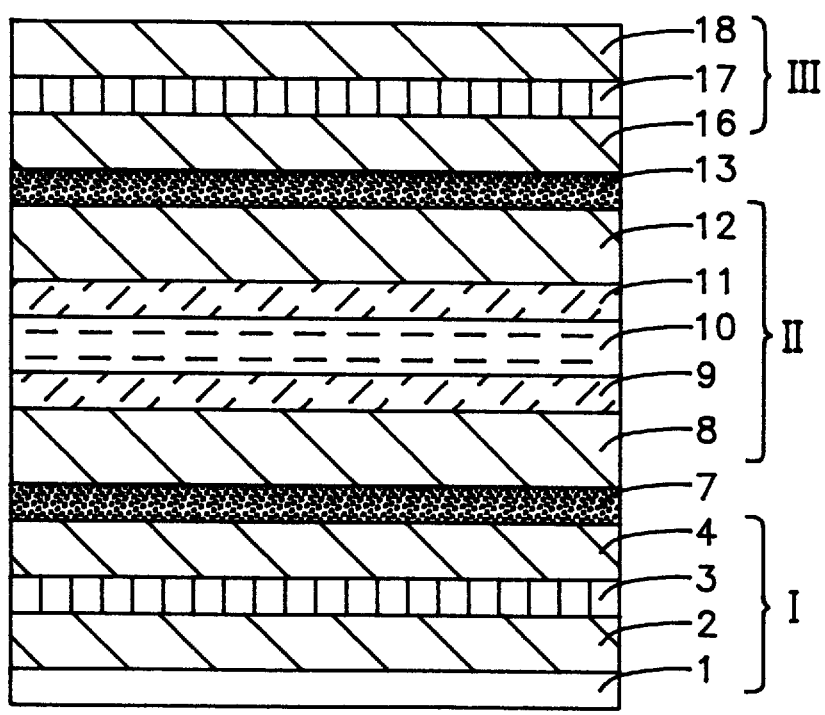
FIG. 2 is a sectional view schematically illustrating the layered structure of an embodiment lacking a phase retarder.

In FIG. 2, the layers are arranged identically, except that the phase retarders (6 & 14) and their associated adhesive layers (5 & 15) are absent. Thus, in this embodiment, the polarizing sheets (I & III) are stuck to the liquid crystal cell by adhesive layers (7 & 13).

According to the present invention, the substrate facing the polarizing sheet, the protective film facing the liquid crystal cell and the phase retarder (namely 4, 6, 8, 12, 14, 16) are made of resins having such a linear expansion coefficient that the differences in the coefficient between the resins are less than $0.5 \times 10^{-5}/°C$. All the substrates, the protective films and the phase retarder (namely, 2, 4, 6, 8, 12, 14, 16 and 18) are preferably made of resins having the linear expansion coefficient.

The adhesive layer, the liquid crystal cell, the phase retarder and the polarizing sheet are described below.

[Adhesive layer]

There is no specific limitation with respect to adhesives contained in an adhesive layer. Various known adhesives can be used in the liquid crystal display of the present invention.

Examples of the elastic adhesives include a polyvinyl alcohol resin, an SBR resin, an acrylic resin and a silicone resin. The acrylic resin is particularly preferred, because the acrylic resin is excellent in heat resistance.

The adhesive layer preferably has a thickness in the range of 1 to 50 μm.

If an elastic adhesive (e.g., an acrylic resin) is used in the adhesive layer, the adhesive layer preferably has a thickness in the range of 10 to 40 μm. Even if a linear expansion coefficient of the elastic adhesive is different from the coefficient of the resins of the substrate, the phase retarder or the protective film, the elasticity of the adhesive can absorb the difference in the coefficient.

If the adhesive is not elastic, the adhesive layer preferably has a thickness in the range of 1 to 10 μm. Even if a linear expansion coefficient of the elastic adhesive is different from the coefficient of the resins of the substrate, the phase retarder or the protective film, the thin adhesive layer can expand or shrink according to the dimensional change of the substrate, the phase retarder or the protective film because such a thin layer is not self-supporting.

[Liquid Crystal Cell]

A liquid crystal cell is usually prepared by incorporating a liquid crystal into a space formed by a pair of substrates and spacers arranged between the substrates.

A transparent electrode is made of transparent electroconductive compounds, and is formed on the substrates.

The liquid crystal cell may further have a gas barrier layer, a hard coat layer or an undercoating layer (used as an adhesive layer of a transparent electrode). These optional layers are usually provided on the substrates.

The substrate of the liquid crystal cell has a thickness usually in the range of 80 to 500 μm. A deterioration inhibitor or a plasticizer can be incorporated into the substrate.

[Phase Retarder]

The phase retarder is a birefringent film having a function of removing color from the display.

A lamination of two films of positive birefringence and negative birefringence can be used as a phase retarder to enlarge the field of the display. Further, a resin film having a liquid crystal layer arranged thereon can also be used as a phase retarder (described in Japanese Patent Provisional Publication Nos. 3(1991)-9325 and 6(1995)-148429). In the phase retarder containing the liquid crystal, the resin film should have the linear expansion coefficient defined in the present invention. Orientation on the phase retarder can be directed in a perpendicular direction by an outer force.

The thickness of the phase retarder is determined by the relation between the retardation value and the birefringence required for the liquid crystal display. The thickness is usually in the range of 30 to 250 μm. Two or more phase retarder sheets can be used in combination to obtain a high retardation value.

[Polarizing Sheet]

The polarizing films of the polarizing sheet include an iodine polarizing film, a dye such as a dichromatic dye polarizing film and a polyene polarizing film. The polarizing film is usually made of a polyvinyl alcohol film.

The protective film of the invention is provided on both sides of the polarizing film. The protective film has a thickness preferably in the range of 25 to 300 μm, and more preferably in the range of 50 to 200 μm. An ultraviolet absorbent, a slip agent, a deterioration inhibitor or a plasticizer can be incorporated into the protective film.

A surface treated membrane can be provided on the protective film, as is shown in FIG. 1. The surface treated membrane can function as a hard coat layer, an anti-fogging layer, an anti-irradiation layer or an anti-reflection layer.

EXAMPLE 1

In 82 weight parts of methylene chloride, 18 weight parts of a polycarbonate resin (Lexane, General Electric Co.) were dissolved to prepare a dope. A substrate, a phase retarder and a protective film were prepared from the dope, as is described below.

(1) Formation of Resin Substrate

The polycarbonate dope was cast on an endless metal support, and was dried. The formed resin film was peeled from the support, and was completely dried to obtain a resin film having the thickness of 150 μm.

The resin film was subjected to a thermal relaxation by heating the film at 190° C. for 20 minutes to reduce the birefringence of the resin. The linear expansion coefficient of the polycarbonate resin measured according to ASTM D-696 was $3.5 \times 10^{-5}/°C$.

(2) Formation of Phase Retarder

The polycarbonate dope was cast on an endless metal support, and was dried. The formed resin film was peeled from the support, and was completely dried to obtain a resin film having the thickness of 70 μm.

The film was conveyed and treated through a preheat zone of 140° C., a stretching zone of 168° C. and then a relaxing zone of 145° C. in the order. Thus the film was stretched by 115%. The obtained phase retarder has the birefringence of 420 nm and the thickness of 62 μm. The linear expansion coefficient of the polycarbonate resin measured according to ASTM D-696 was $3.5 \times 10^{-5}/°C$.

(3) Formation of Protective Film

In 64 weight parts of methylene chloride, 30 weight parts of the following ultraviolet absorbing agent was dissolved to prepare a solution. To 100 weight parts of the polycarbonate dope, 2.0 weight parts of the ultraviolet absorbing agent solution was added. Further, 0.04 weight part of silicon dioxide particles (average size of primary particles: 0.016 μm) was added to 100 weight parts of the resulting mixture. If the silicon dioxide particles (slip agent) were not uniformly dispersed in the dope, the particles were first dispersed in a diluted dope, and then the dispersion was added to the dope.

(Ultraviolet absorbing agent)

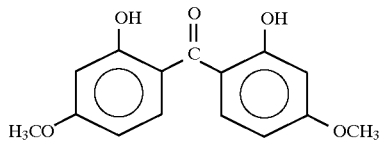

The obtained mixture was cast on an endless metal support, and was dried. The formed resin film was peeled from the support, and was completely dried to obtain a resin film having the thickness of 80 μm.

The resin film was subjected to a thermal relaxation by heating the film at 190° C. for 20 minutes to reduce the birefringence of the resin. The linear expansion coefficient of the polycarbonate resin measured according to ASTM D-696 was $3.5 \times 10^{-5}$/°C.

(4) Preparation and Evaluation of Liquid Crystal Display

A liquid crystal display shown in FIG. 1 was prepared by using the above-prepared substrate, phase retarder and protective film. The adhesive layers (5, 7, 13 and 15 in FIG. 1) comprise an acrylic resin. The thickness of the adhesive layers was 15 μm.

The liquid crystal display was left at 100° C. for 1,000 hours for evaluating heat resistance. As a result, no deformation was observed on the display and an image formed thereon.

Further, the liquid crystal display was left at 80° C. and 95% RH for 1,000 hours for evaluating heat moisture resistance. As a result, no deformation was observed on the display and an image formed thereon.

COMPARISON EXAMPLE 1

A liquid crystal display was prepared from the following combination of resin films.

(1) Formation of Resin Substrate

In 83 weight parts of methylene chloride, 17 weight parts of polyarylate resin were dissolved to prepare a dope. The dope was cast on an endless metal support, and was dried. The formed resin film was peeled from the support, and was completely dried to obtain a resin film having the thickness of 150 μm.

The resin film was subjected to a thermal relaxation by heating the film at 215° C. for 20 minutes to reduce the birefringence of the resin. The linear expansion coefficient of the polyarylate resin measured according to ASTM D-696 was $6.2 \times 10^{-5}$/°C.

(2) Formation of Phase Retarder

A phase retarder made of a polycarbonate film was prepared in the same manner as in Example 1. The linear expansion coefficient of the polycarbonate resin measured according to ASTM D-696 was $3.5 \times 10^{-5}$/°C.

(3) Formation of Protective Film

In 365 weight parts of methylene chloride and 35 weight parts of methanol, 100 weight parts of cellulose triacetate and 12 weight parts of triphenyl phosphate (plasticizer) were dissolved to prepare a dope.

The ultraviolet absorbent and the slip agent used in Example 1 were added to the dope at the same weight ratio as in Example 1.

The obtained mixture was cast on an endless metal support, and was dried. The formed resin film was peeled from the support, and was completely dried to obtain a resin film having the thickness of 80 μm.

The resin film was not subjected to a thermal relaxation, because the cellulose acetate film has low birefringence. The linear expansion coefficient of the cellulose triacetate resin measured according to ASTM D-696 was $5.4 \times 10^{-5}$/°C.

(4) Preparation and Evaluation of Liquid Crystal Display

A liquid crystal display shown in FIG. 1 was prepared by using the above-prepared substrate, phase retarder and protective film. The adhesive layers (5, 7, 13 and 15 in FIG. 1) comprise an acrylic resin. The thickness of the adhesive layers was 15 μm.

The liquid crystal display was left at 100° C. for 1,000 hours for evaluating heat resistance. As a result, a change of hue was observed around the image (like a picture frame). This deformation of the image was caused by a dimensional difference between the protective film of the polarizer and the phase retarder.

Further, the liquid crystal display was left at 80° C. and 95%RH for 1,000 hours for evaluating heat moisture resistance. As a result, a change of hue was observed around the image (like a picture frame). Moreover, a peripheral adhesive layer peeled slightly from the display.

As is described above, the liquid crystal display of the present invention is free from the problems about the dimensional stability, such as distortion of an image or peeling of an adhesive layer. Further, a substrate of a liquid crystal cell, a protective film of a polarizing sheet and a phase retarder can independently function in a liquid crystal display of the present invention.

I claim:

1. A liquid crystal display which comprises a liquid crystal cell and a polarizing sheet stuck with an adhesive layer, said cell comprising a liquid crystal interposed between a pair of resinous substrates, at least one of which has a transparent electrode, and said polarizing sheet comprising a polarizing film interposed between a pair of resinous protective films, wherein the difference in a linear expansion coefficient between the resin of the substrate adjacent to the polarizing sheet and the resin of the protective film adjacent to the liquid crystal cell is less than $0.5 \times 10^{-5}$/°C.

2. The liquid crystal display as claimed in claim 1, wherein the difference in the linear expansion coefficient is less than $0.3 \times 10^{-5}$/°C.

3. The liquid crystal display as claimed in claim 1, wherein the resin of the substrate adjacent to the polarizing sheet and the resin of the protective film adjacent to the liquid crystal cell are identical.

4. The liquid crystal display as claimed in claim 1, wherein differences in linear expansion coefficients between the resins of the substrates and the resins of the protective films are less than $0.5 \times 10^{-5}$/°C.

5. The liquid crystal display as claimed in claim 4, wherein the differences in the linear expansion coefficients are less than $0.3 \times 10^{-5}$/°C.

6. The liquid crystal display as claimed in claim 4, wherein the resins of the substrates and the resins of the protective films are identical.

7. A liquid crystal display which comprises a liquid crystal cell, a polarizing sheet and a resinous phase retarder stuck with adhesive layers, said cell comprising a liquid crystal interposed between a pair of resinous substrates, at least one of which has a transparent electrode, and said polarizing sheet comprising a polarizing film interposed between a pair of resinous protective films, and said phase retarder being interposed between said liquid crystal cell and said polarizing sheet, wherein differences in a linear expansion coefficient among the resin of the substrate adjacent to the polarizing sheet, the resin of the protective film adjacent to the liquid crystal cell and the resin of the phase retarder are less than $0.5 \times 10^{-5}$/°C.

8. The liquid crystal display as claimed in claim 7, wherein the differences in the linear expansion coefficients are less than $0.3 \times 10^{-5}$/°C.

9. The liquid crystal display as claimed in claim 7, wherein the resin of the substrate adjacent to the polarizing sheet, the resin of the protective film adjacent to the liquid crystal cell and the resin of the phase retarder are identical.

10. The liquid crystal display as claimed in claim 7, wherein differences in linear expansion coefficients among the resins of the substrates, the resins of the protective films and the resin of the phase retarder are less than $0.5 \times 10^{-5}/°C$.

11. The liquid crystal display as claimed in claim 10, wherein the differences in the linear expansion coefficients are less than $0.3 \times 10^{-5}/°C$.

12. The liquid crystal display as claimed in claim 10, wherein the resins of the substrates, the resins of the protective films and the resin of the phase retarder are identical.

13. A liquid crystal display which comprises a liquid crystal cell and a polarizing sheet adhered thereto, said cell comprising a liquid crystal interposed between a pair of resinous substrates and adhered thereto, at least one of said resinous substrates has a transparent electrode adhered thereto on the liquid crystal side of the substrate, and said polarizing sheet comprising a polarizing film interposed between a pair of resinous protective films and adhered thereto, wherein the difference in a linear expansion coefficient between the resin of the substrate adjacent to the polarizing sheet and the resin of the protective film adjacent to the liquid crystal cell is less than $0.5 \times 10^{-5}/°C$.

14. The liquid crystal display as claimed in claim 13, wherein the difference in the linear expansion coefficients is less than $0.3 \times 10^{-5}/°C$.

15. The liquid crystal display as claimed in claim 13, wherein the resin of the substrate adjacent to the polarizing sheet and the resin of the protective film adjacent to the liquid crystal cell are identical.

16. A liquid crystal display which comprises a liquid crystal cell, a polarizing sheet and a resinous phase retarder joined by adhesive layers, said liquid crystal cell comprising a liquid crystal interposed between and adhered to a pair of resinous substrates, at least one of which has a transparent electrode adhered thereto on the liquid crystal side of the substrate, said polarizing sheet comprising a polarizing film interposed between a pair of resinous protective films and adhered thereto, and said phase retarder being interposed between said liquid crystal cell and said polarizing sheet and adhered thereto, wherein the differences in linear expansion coefficients among the resin of the substrate adjacent to the polarizing sheet, the resin of the protective film adjacent to the liquid crystal cell and the resin of the phase retarder are less than $0.5 \times 10^{-5}/°C$.

17. The liquid crystal display as claimed in claim 16, wherein the differences in the linear expansion coefficients are less than $0.3 \times 10^{-5}/°C$.

18. The liquid crystal display as claimed in claim 16, wherein the resin of the substrate adjacent to the polarizing sheet, the resin of the protective film adjacent to the liquid crystal cell and the resin of the phase retarder are identical.

19. A liquid crystal display comprising a liquid crystal cell comprising a liquid crystal interposed between a pair of substrates comprising a first resin and at least one polarizing sheet comprising a polarizing film and a protective film comprising a second resin, wherein said at least one polarizing sheet is adhered to one or both sides of said liquid crystal cell; the improvement in which is that said pair of substrates of said liquid crystal cell comprise a first resin having a coefficient of expansion that is less than or equal to $0.5 \times 10^{-5}/°C$. greater than or less than the coefficient of expansion of said second resin.

20. The liquid crystal display of claim 19, wherein each of said resins is selected from the group consisting of a polycarbonate resin, a polysulfone resin, a norbornene resin, a polyacrylate resin, a polymethacrylate resin and a polyester resin.

21. The liquid crystal display of claim 20, wherein each of said resins is a polycarbonate resin and has a glass transition temperature of not lower than 120° C.

22. The liquid crystal display of claim 20, wherein each of said resins is a polyacrylate resin and has a coefficient of expansion of $4 \times 10^{-5}/°C$. to $7 \times 10^{-5}/°C$.

* * * * *